United States Patent
Cranston et al.

(10) Patent No.: US 12,515,355 B1
(45) Date of Patent: Jan. 6, 2026

(54) COMBINATION END-OF-ARM TOOL

(71) Applicant: Alliance Automation, LLC, Flint, MI (US)

(72) Inventors: Steven Cranston, Fenton, MI (US); Jamil Hamadeh, Grand Blanc, MI (US)

( * ) Notice: Subject to any disclaimer, the term of this patent is extended or adjusted under 35 U.S.C. 154(b) by 488 days.

(21) Appl. No.: 18/087,783

(22) Filed: Dec. 22, 2022

(51) Int. Cl.
*B25J 15/00* (2006.01)
*B25J 9/12* (2006.01)
*B25J 9/14* (2006.01)
*B25J 11/00* (2006.01)

(52) U.S. Cl.
CPC .......... *B25J 15/0066* (2013.01); *B25J 9/123* (2013.01); *B25J 9/144* (2013.01); *B25J 11/0055* (2013.01); *B25J 15/0019* (2013.01)

(58) Field of Classification Search
CPC ........ B25J 15/0066; B25J 9/123; B25J 9/144; B25J 11/0055; B25J 15/0019
See application file for complete search history.

(56) References Cited

U.S. PATENT DOCUMENTS

| | | | |
|---|---|---|---|
| 10,518,337 B2 * | 12/2019 | Kschier | B25J 9/0084 |
| 11,745,380 B2 * | 9/2023 | Dereims | B26D 5/18 83/177 |
| 2013/0035696 A1 * | 2/2013 | Qutub | A61B 34/10 606/130 |
| 2015/0298343 A1 * | 10/2015 | Jung | B26F 3/008 83/34 |
| 2022/0226995 A1 * | 7/2022 | Beck | B25J 9/1641 |

* cited by examiner

*Primary Examiner* — Ryan J. Walters
(74) *Attorney, Agent, or Firm* — Laurence C. Begin (57) ABSTRACT

A robotic manufacturing system is presented, wherein the system includes a novel combination end-of-arm tool. A routing or drilling system and a waterjet system are together integrated within the tool.

16 Claims, 14 Drawing Sheets

COMBINATION END-OF-ARM TOOL

FIELD OF THE INVENTION

The present invention relates to improvements in manufacturing using robotic cutting tools such as router, waterjet, and drill systems.

BACKGROUND OF THE INVENTION

With the advent of robotic tools for manufacturing and forming various products in the automotive, aerospace, and marine industries, for example, challenges remain with regard to optimizing the efficiency of the robotic tools and the associated manufacturing processes.

Yet further, certain robotic processes result in some waste because of the damage done to peripheral areas of the cuts, slots, holes and other features in various molded parts. When manufacturing molded parts made from composites such as sheet molding compounds (SMC), carbon fiber reinforced plastic (CFRP), fiberglass reinforced plastics (FRP), resin transfer molding (RTM) materials, dicyclopentadiene (DCPD), fiberglass, and other materials, damage to these materials may increase the production costs and also increase the manufacturing time, for example. Examples of molded composite parts include heavy truck panels, marine decks and hulls, consoles, truck caps, and more.

Known tools used in these types of production processes include robotic router systems and robotic waterjet systems, for example. One issue with the router systems is that although they may be preferred for cutting thicker composites, use of the router results in very dusty air and also does not have the same cut quality as waterjet systems. Bits and spindles have to be replaced often, and the router system is generally not considered to be as safe as the waterjet system. Waterjet systems on the other hand are not as tough as the router systems, as they do not fully penetrate various substrates to make burr-free or crack-free orifices, for example. Stated another way, when water is initially introduced to the part through the waterjet, a "pierce" is formed on the surface of the part, whereby the pierce often damages the material and creates cracking on the surface (e.g., "pierce damage"). This leads to concern when cutting relatively smaller holes, less than 8 mm for example. Once the waterjet cutting is complete, the part must be trimmed around the hole to remove any cracking that may have occurred.

Yet another challenge lies in the packaging space available for an end-of-arm tool. When two or more functions are desired, such as a cutting and routing functions for example, two or more tools should be efficiently combined in a multifunctional end-of-arm tool to ensure that the tool can provide the necessary functional reach, while yet still being able to operate within confined spaces within the formable substrate. In view of the above, long-felt needs in the robotic manufacturing industry described above include optimizing efficiency of the process and the tooling, and, eliminating or at least reducing the amount of scrap materials that result from these processes.

SUMMARY

To respond to the above-referenced challenges, and in accordance with the present invention, a novel robotic end-of-arm tool is provided that operatively communicates with a known robot in a novel way. In one aspect of the invention, a router and/or drill is included in the tool, preferably pneumatically actuated. In a second aspect of the invention, a waterjet system is also integrated within the tool.

In a process utilizing the end-of-arm tool, the router or drill may be used to perforate the composite or molded product to initiate the cut so that cracks emanating from the initial cut are prevented. Accordingly, although a router generally differs in function from a drill, the router may, depending on the substrate thickness for example, provide an initial cut that is similar to the pierce of a drill bit. The cut is large enough to facilitate a subsequent cut from a router or waterjet. A drill bit preferably is at least ⅛ inch in diameter or greater, to minimize breakage or fracture of the bit. After the drill perforates the composite or product material, the adjacent waterjet may be used to finish the cut as per design specifications. If a router is used, a cut may be made with due care, in a similar manner to the drill bit.

Stated another way, in accordance with the present invention, a robotic manufacturing system contains: a robot containing an arm having an end; a combination end-of-arm tool fixed to the end of the arm, wherein the tool contains a housing having a first end and a second end; a router or drilling system contained within said housing; and a waterjet system contained within the housing and fixed adjacent to the drilling system, wherein the waterjet system is plumbed to a high-pressure water source, in a known manner.

In another aspect of the invention, an end-of-arm tool for a robot contains: a housing having a first end and a second end; a router or drilling system contained within the housing; and a waterjet system contained within the housing and fixed adjacent to the drilling system, the waterjet system plumbed to a high-pressure water source in a known manner.

In yet another aspect of the invention, a method of manufacturing a material using a robotic end-of-arm tool in accordance with the present invention is as follows:
1. Provide a robot containing an end-of-arm tool that has a router or drilling system 14 and a waterjet system 16 integrated or contained therein;
2. Provide a product material for processing by the robot;
3. Actuate a router or drilling system and initiate at least one small cutting point, and if desired, at least one more hole in the product material; and,
4. Optionally, actuate a waterjet system and cut at least one cut about the periphery of the small cutting point.

DETAILED DESCRIPTION OF THE INVENTION

| Listing of Parts | |
|---|---|
| combination end-of-arm tool | 10, 110 |
| first end of the tool housing | 12 |
| second end of the tool housing | 14 |
| water jet assembly system | 16 |
| router/drill system | 18 |
| water jet on/off valve | 22 |
| high-pressure water inlet | 24 |
| nozzle or focusing tube | 26 |
| drill chuck | 28 |
| drill bit | 30 |
| router/drill spindle | 32 |
| linear motion slide assembly | 34 |
| tool housing | 40 |
| first robot mounting plate | 42 |
| mounting clamp for HP water line | 44 |
| robot | 46 |
| waterjet mounting bar | 47 |
| robot arm/wrist | 48 |
| rail | 50 |
| carriage | 52 |
| air cylinder | 60 |
| robotic system | 100 |
| compressed air supply | 112 |
| first air line or hose | 114 |
| second air line or hose | 115 |
| first end of the first air line | 116 |
| cylinder piston | 117 |
| second end of the first air line | 118 |
| first air valve | 120 |
| robotic control module or controller | 122 |
| third air line or hose | 124 |
| third end of the second air line | 126 |
| fourth end of the second air line | 128 |
| second air valve | 130 |
| high-pressure water line | 132 |
| fifth end of the water line | 134 |
| sixth end of the water line | 136 |
| high-pressure water supply | 138 |
| first cylinder inlet/outlet | 140 |
| second cylinder inlet/outlet | 142 |
| router motor | 144 |
| advancement solenoid | 146 |
| retraction solenoid | 148 |
| third air valve | 150 |
| fourth air line or hose | 152 |
| waterjet exhaust | 210 |
| first valve actuation exhaust | 212 |
| first valve retraction exhaust | 214 |
| first router/drill motor exhaust | 216 |
| second router/drill motor exhaust | 218 |

As shown in the Figures, a combination end-of-arm tool 10 is shown, as prepared for installation onto a robot arm/wrist 48 of a robot 46. A tool housing 40 has a first end 12 and a second end 14, for containment of tool constituents as described below. A first robot mounting plate 42 is fixed at the second end 14, for fixing the combination end-of-arm tool 10 to the arm/wrist 48 of a robot 46, for operable communication therewith as known in the art, and as schematically shown in the Figures. See FIG. 8, for example. A mounting clamp 44 for a hire-pressure water line is oriented toward the first end 12 for fixing the high-pressure water line to the multitool 10 proximate to the water inlet 24, in a known manner and as schematically shown in the Figures. A robotic waterjet assembly system 16 is fixed to the first end 12 for use in cutting and/or trimming manufactured products. A waterjet mounting bar 47 provides a base at the first end 12, for fixing the waterjet assembly system 16 thereto. A robotic router/right angle drill system 18 is also fixed to extend above the first end 12, and juxtaposed above the waterjet assembly system 16. It will be appreciated that the router/right angle drill system 18 contains a preferred orientation of the router or drill chuck 28, and therefore, the angular orientation of the right-angle router or drill system 18 may be positioned from 10-180 degrees with regard to the router or drill spindle 32.

With reference again to the waterjet assembly system 16, a water jet on/off valve 22 contains a high-pressure water inlet 24 that when in operation is connected to a high-pressure water source channeled through a high-pressure plumbing assembly (not shown) in a known manner. A nozzle or focusing tube 26 channels the high-pressure water stream through the on/off valve 22 to the operable work surface. The waterjet assembly system 16 of an exemplary embodiment may have a pressure of 60K psi, or other operating pressures, for example. In general, exemplary pressures may be up to 90K psi, and in a preferred embodiment, may range from 40k psi to 90k psi.

With reference again to the drill system 18, a drill chuck 28 contains a drill bit 30 during operation. A router or drill spindle 32 is connected to the router or drill chuck 28 and rotates the router or drill bit 30 at a desired speed in rotations per minute (RPM). A linear motion slide 34 such as a pneumatic slide 34 is connected to and slidably communicates with the router or drill spindle 32 so that the router or drill spindle 32 may be extended into tight areas or retracted as desired by the operator. The linear motion slide 34 may be defined as a structure that facilitates the slidable engagement of the router or drilling system 18 therewith, for extraction and retraction of the router or drilling system 18 during operation of the router or drilling system 18, for example.

Figure 1:
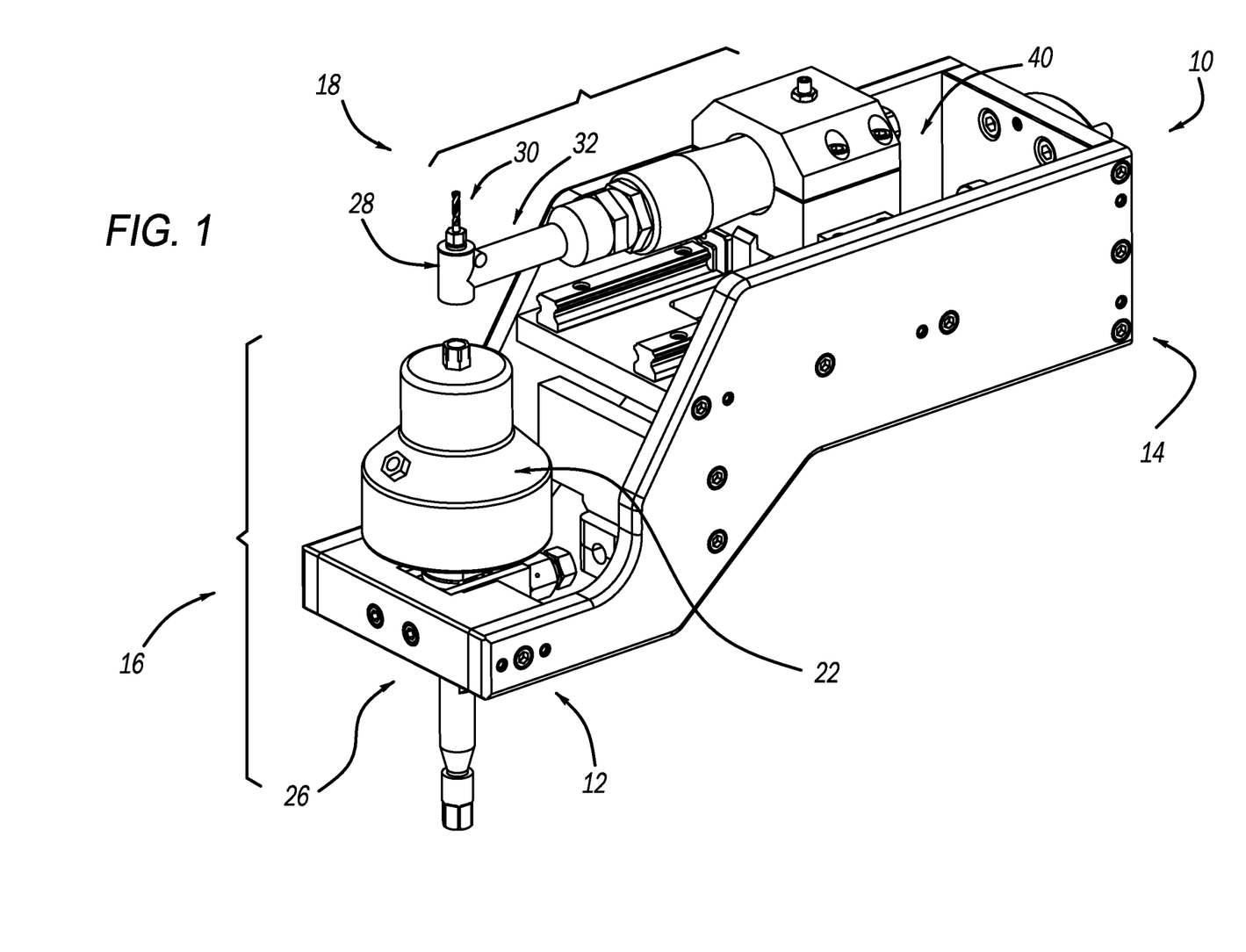
FIG. 1 is a first perspective view of an exemplary embodiment of an end-of-arm multitool.
Figure 2:
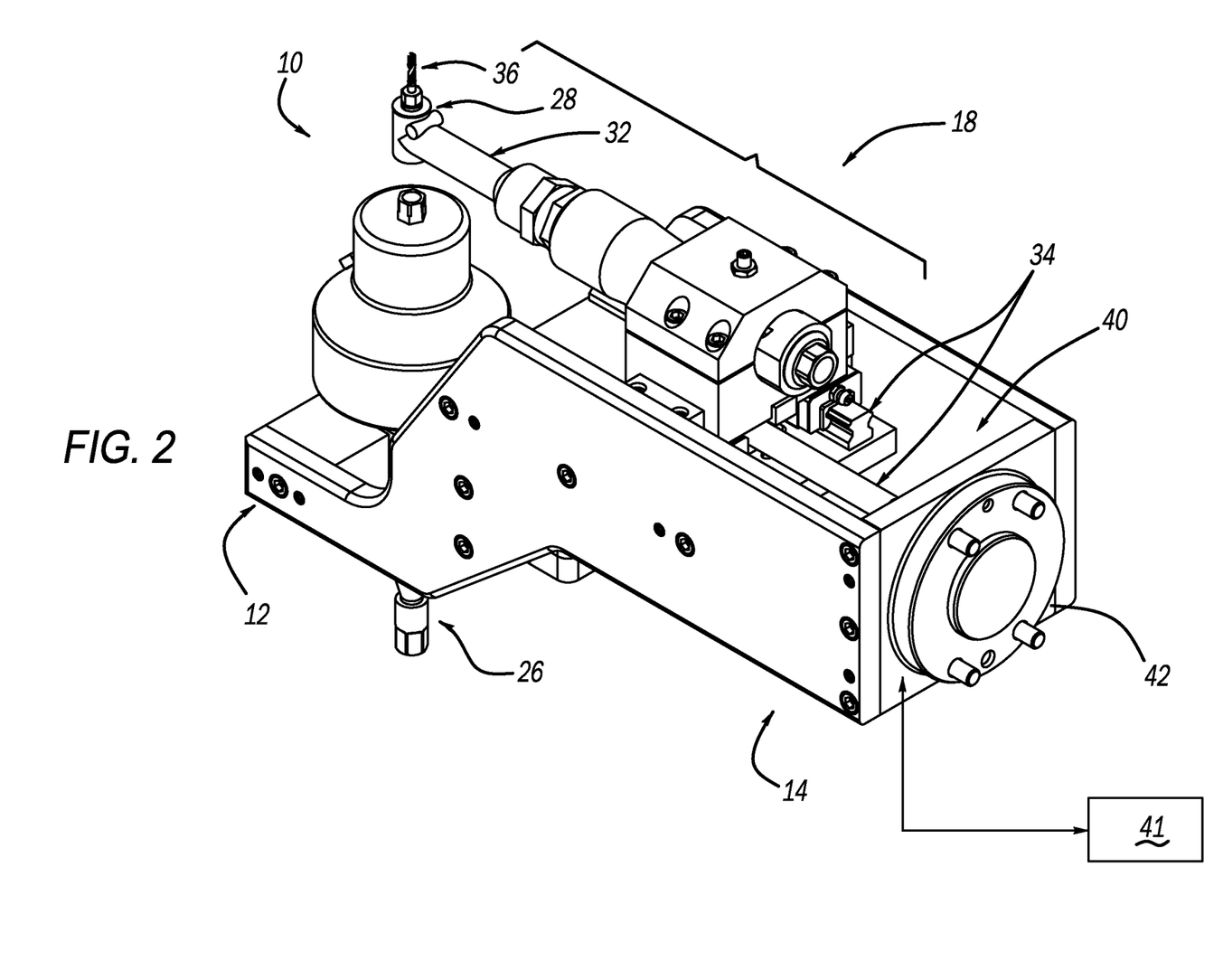
FIG. 2 is a second perspective view of the exemplary embodiment of FIG. 1.
Figures 3, 4:
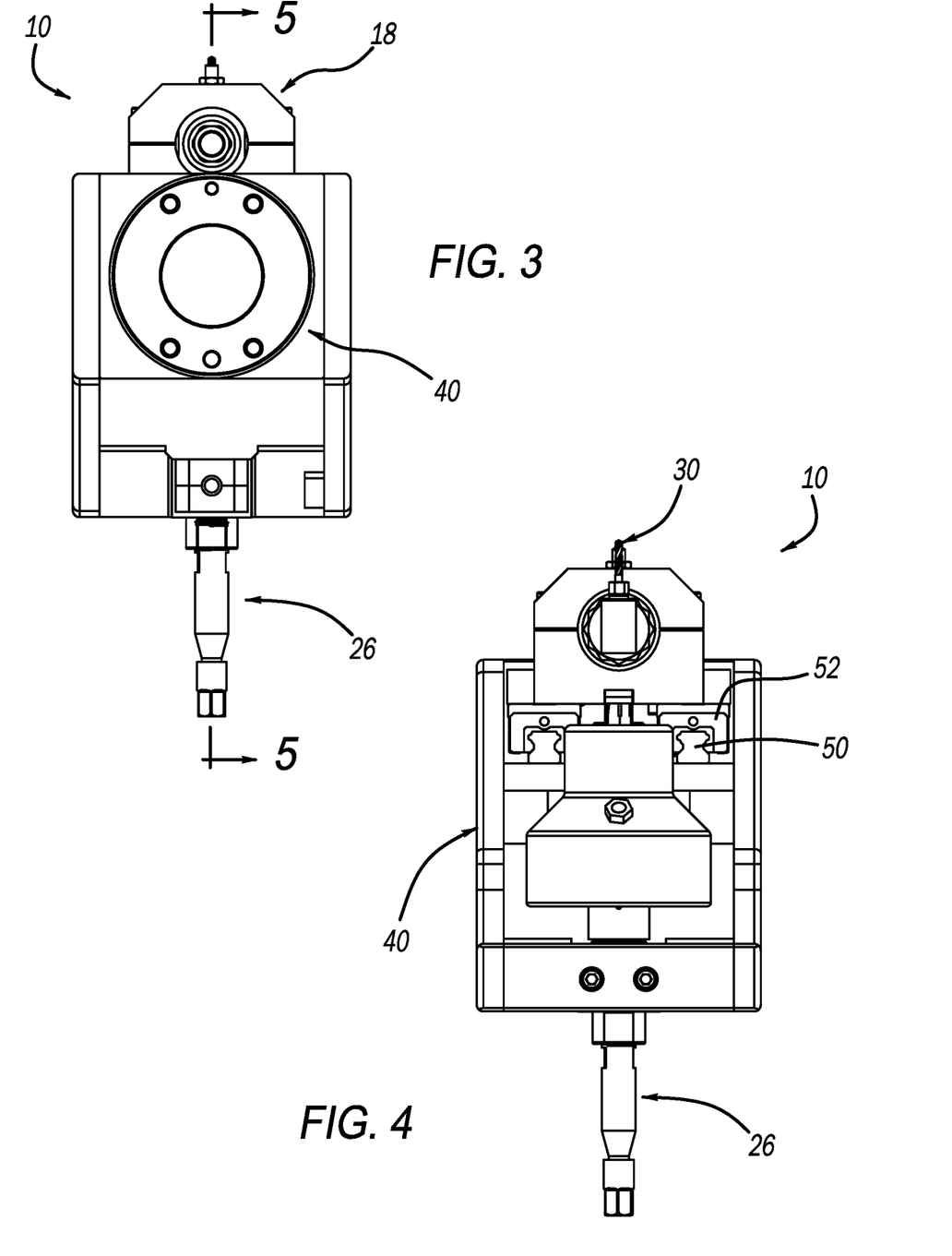
FIG. 3 is a rear view of the embodiment of FIG. 1.
FIG. 4 is a front view of the embodiment of FIG. 1.
Figure 5:
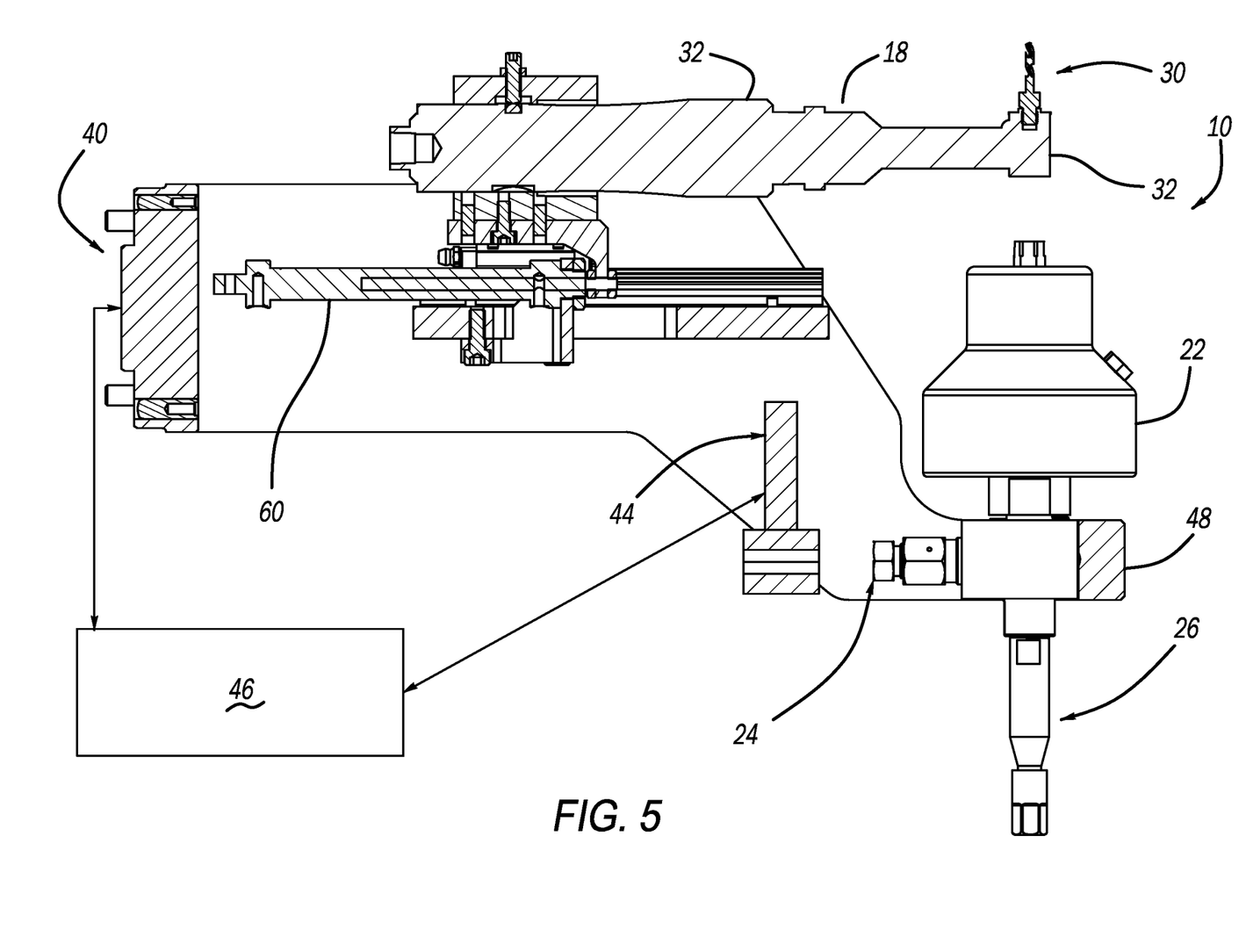
FIG. 5 is a sectional view of the embodiment of FIG. 1, taken along the lines of A-A of FIG. 3.
Figure 6:
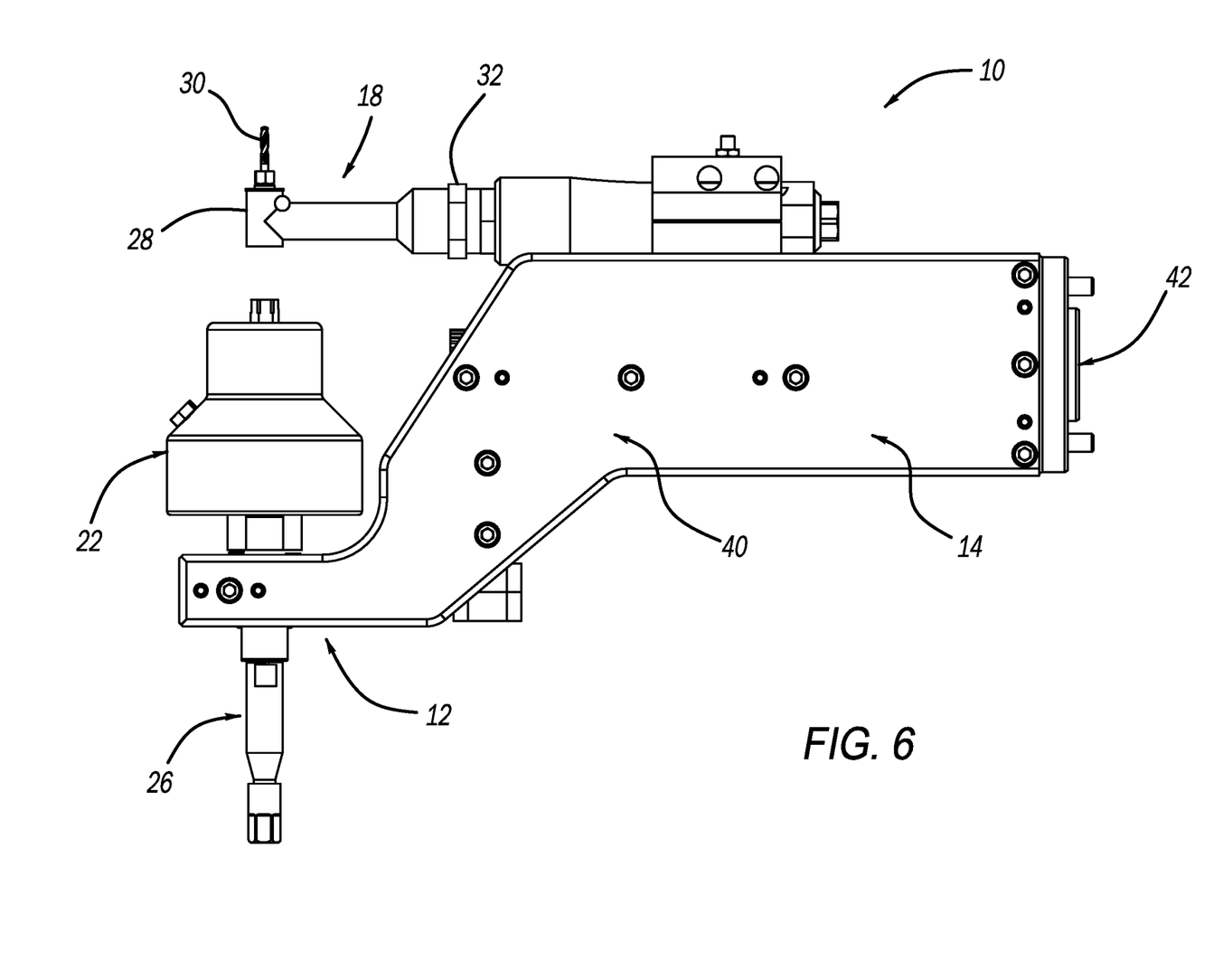
FIG. 6 is a side view of the embodiment of FIG. 1.
Figure 7:
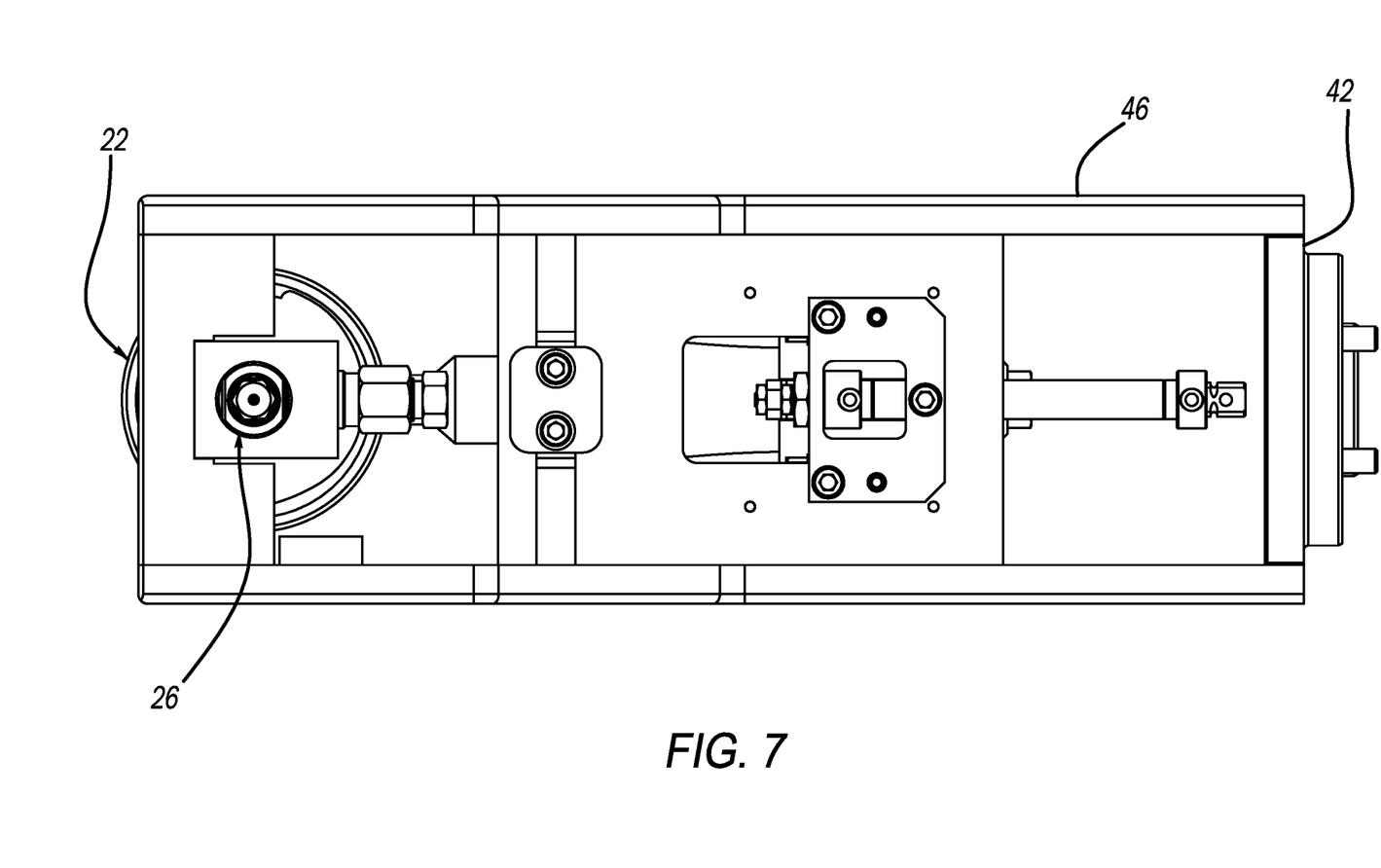
FIG. 7 is a bottom view of the embodiment of FIG. 1.

As shown in FIG. 4 and not by limitation, in a first embodiment, an exemplary slide 34 contains a rail 50 that is longitudinally fixed and oriented within the housing 40, thereby forming a bottom portion of the linear motion slide assembly 34, as exemplified with the pneumatic slide 34 shown in the Figures. It will be appreciated that other linear motion slide assemblies such as electronic linear slide assemblies or hydraulic linear slide assemblies, for example, are also contemplated and included in the term, linear motion slide assembly. As further shown in FIG. 4, a carriage 52 forms a top portion of the pneumatic slide 34, and is seated within the rail 50 that forms a seat to hold the drilling system 18 secured thereto, as the carriage 52 slidably engages the rail 50.

Figure 12A:
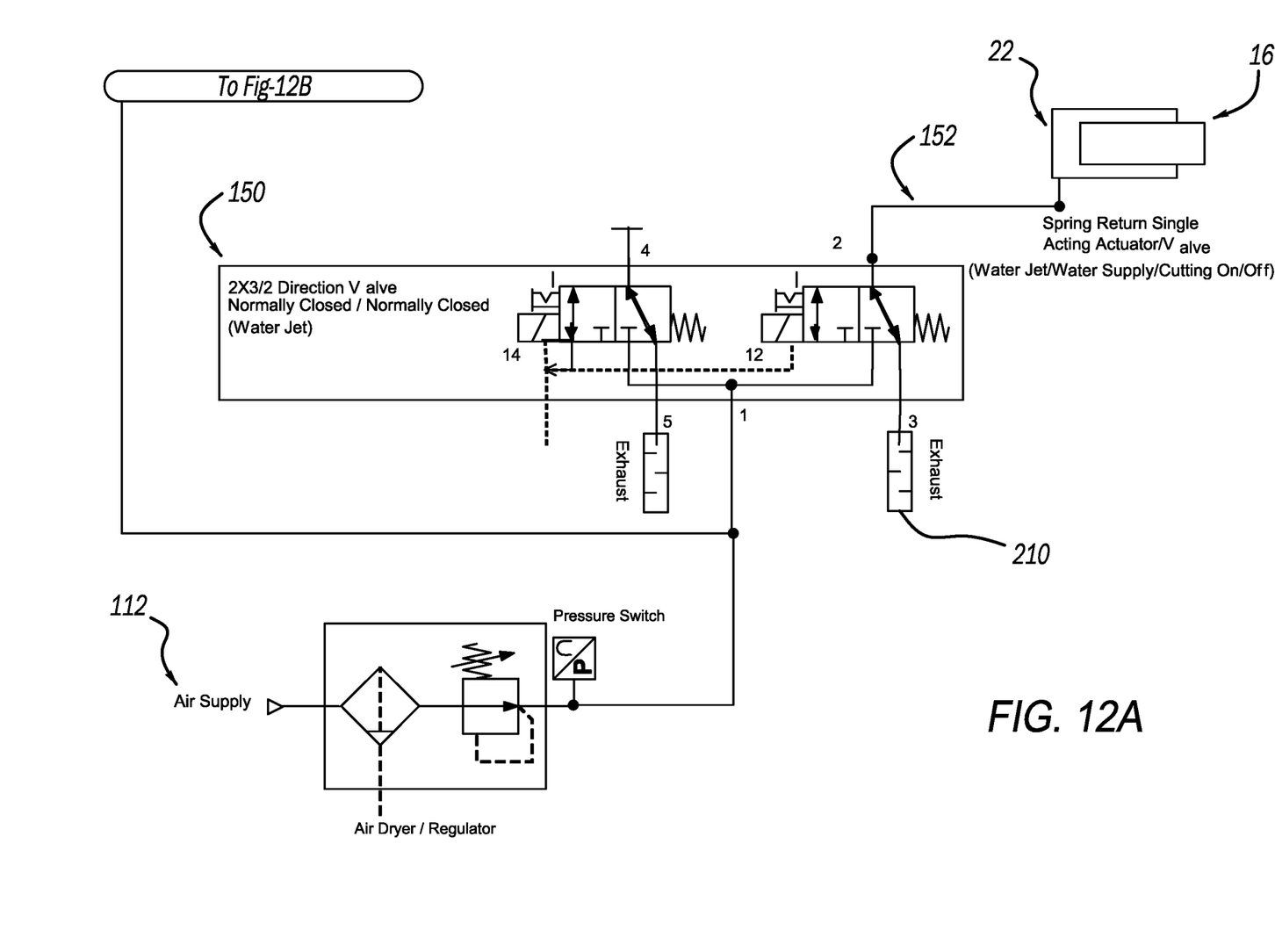
FIG. 12A schematically illustrates an air supply providing compressed air in selective fluid communication with the water jet water supply, in accordance with the present invention.

Again, with regard to FIG. 4, FIG. 8, and also FIG. 12A, an air cylinder 60 contained within the linear motion slide assembly 34 fluidly communicates with a compressed air supply 112 for actuation of the pneumatic slide 34. As shown in FIGS. 3 and 4, the air cylinder 60 is secured within an upper clamp 160 and a lower clamp 162, and is seated upon the carriage 52 that slides linearly upon rail 50. Accordingly, a first air line 114 is connected to the compressed air supply 112 (having a resident or operating pressure at about 10-120 psi) and to the air cylinder 60, to thereby selectively provide compressed air to actuate the pneumatic slide 34. In one embodiment, a third and separate air line or hose 124 fluidly communicates with the router or drill motor 144 and the router or drill spindle 32, for powering rotation thereof.

Figure 8:
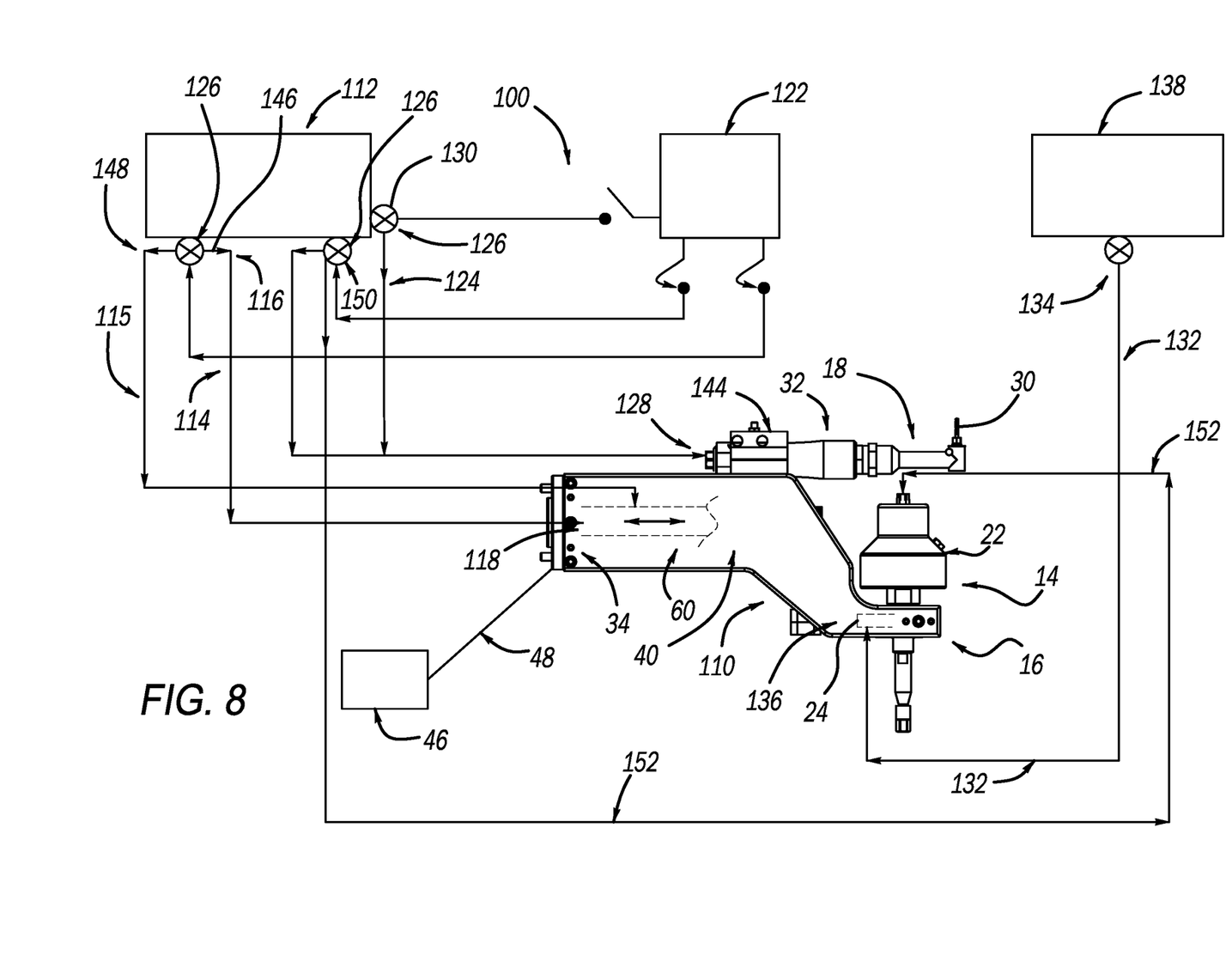
FIG. 8 is a schematic illustration of the air and water flow into one embodiment of an end-of-arm multitool, in accordance with the present invention.
Figure 11:
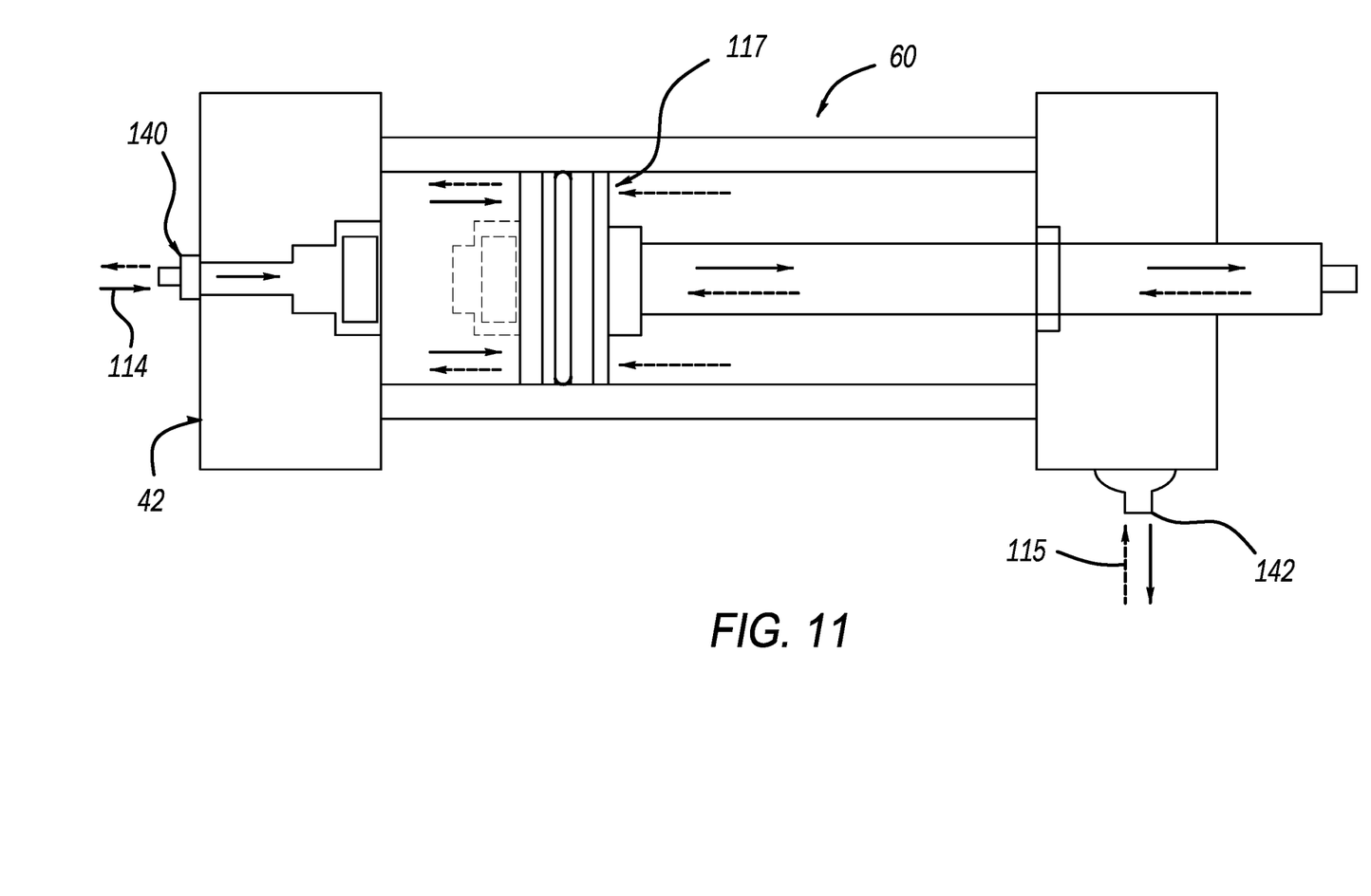
FIG. 11 schematically illustrates the extension and retraction of the piston within the cylinder, in accordance with the present invention.
Figure 12B:
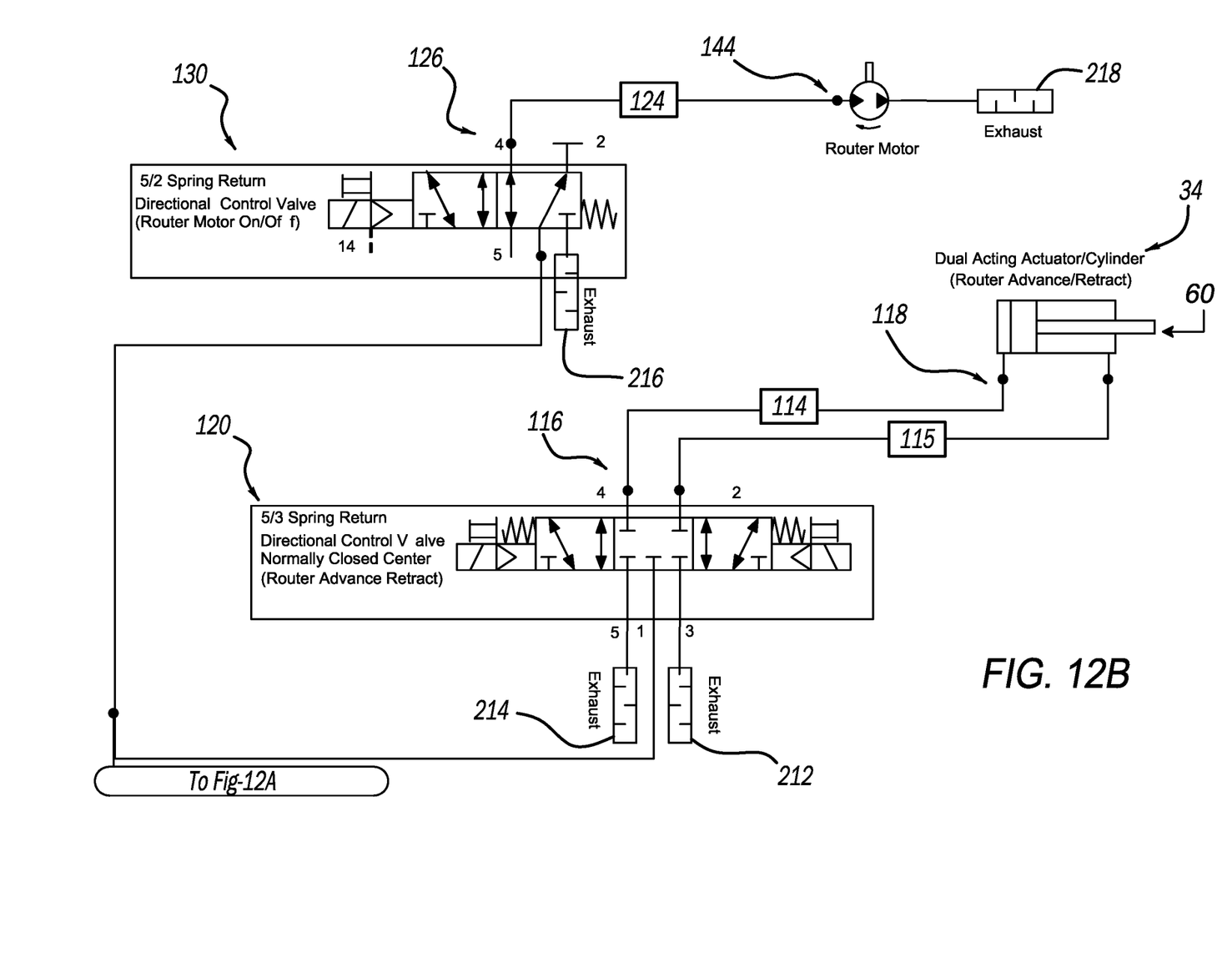
FIG. 12B schematically illustrates an air supply providing compressed air in selective fluid communication with the router motor and the linear motion slide assembly, in accordance with the present invention.

With reference to FIGS. 8, 11, and 12A, a first valve 120 selectively regulates the air supply provided through the first air line 114 and a second air line 115, to the air cylinder 60. In a first selection, an advancement solenoid 146 in operable communication with the first air valve 120 is actuated to provide air pressure to the first air line 114. Air pressure is thereby directed through the first air line 114 to actuate the linear motion slide assembly 34. A cylinder piston 117 within the cylinder 60 is thereby advanced, whereby the router or drilling assembly 18 is extended for use at the second end 14 of the tool 10. As shown in FIG. 11, the first air line 114 is connected to a first air inlet/outlet 140 to push air into the cylinder 60 to push the piston 117 forward, to bring the router/drill assembly 18 into the extended position. As further shown in FIG. 11, the solid arrows show the direction of the piston 117 and airflow that corresponds to the extended position of the router/drill 18. As shown in FIG. 12B, the first valve 120 contains a first valve actuation exhaust 212, for venting residual air during the extension or actuation of the linear motion slide assembly 34 (when pneumatically actuated).

In a second selection, or in a default position, the air pressure from air supply 112 may be directed through the first valve 120 by actuation of a retraction solenoid 148 at first valve 120. The air is therefore pumped or directed through the second air line 115 connected to a second inlet/outlet that 142 that conveys air into an opposite end of the cylinder 60, to push the piston 117 back into a retracted position to retract the router/drill 18 within the cylinder 60 to the normally closed or retracted position. As with the actuation step, the first valve 120 further contains a first valve retraction exhaust 214, for venting residual air during the retraction of the linear motion slide assembly 34 (when pneumatically retracted). As further shown in FIG. 11, the dashed arrows show the direction of the piston 117 and the airflow that corresponds to the retracted position of the router/drill 18.

A second valve 130 selectively regulates the air supply 112 provided through the third air line 124, to the router/drill assembly 18. As shown in FIG. 12B, the second air valve 130 may further contain a first router/drill motor exhaust 216 (when pneumatically actuated), for venting residual air upon termination of router/drill motor 144. If desired, a second router/drill motor exhaust 218 may be installed further downstream of the router/drill motor 144, again for venting residual air from the router/drill assembly 18.

Figure 9:
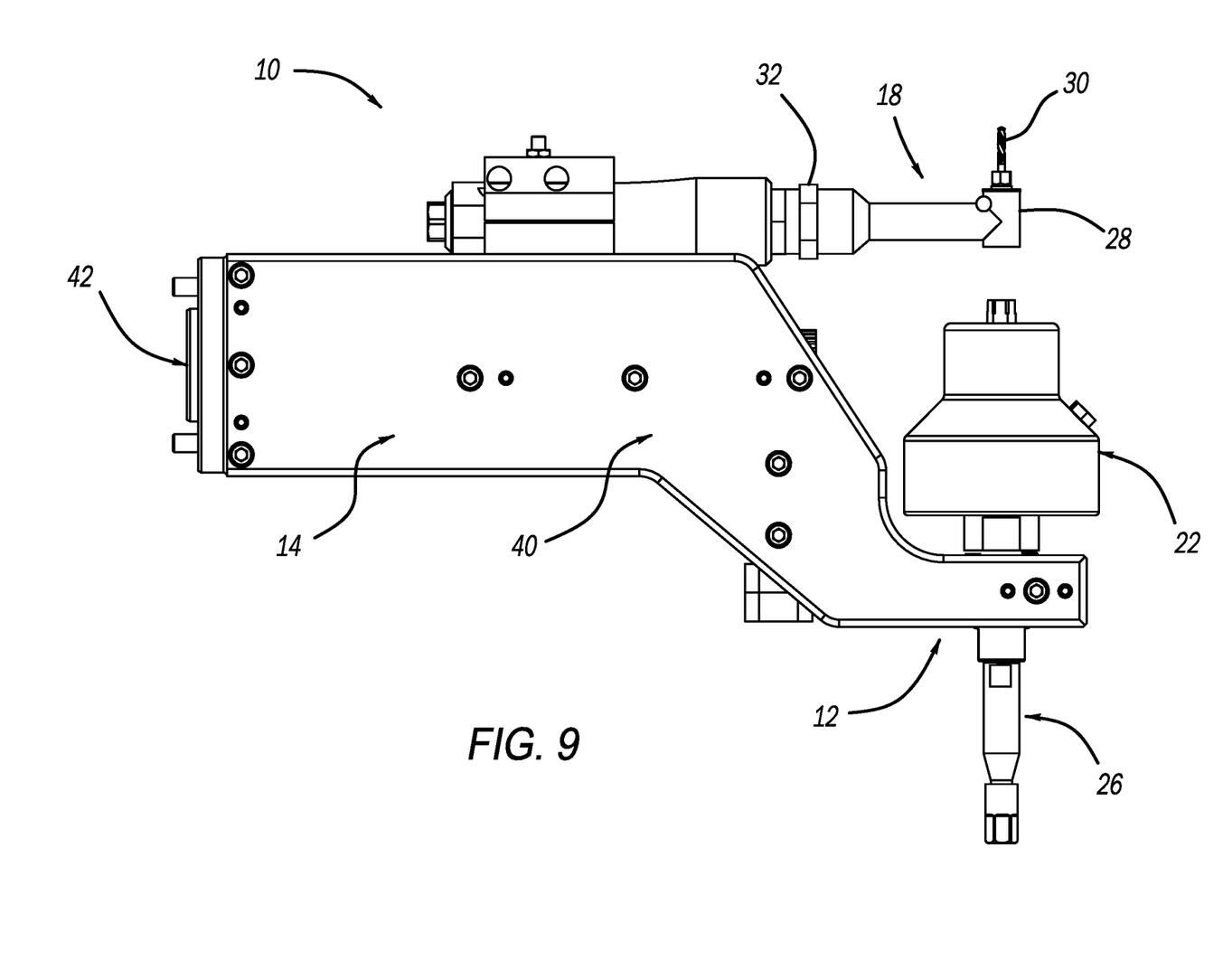
FIG. 9 schematically illustrates a retracted position of the drilling system, in accordance with the present invention.
Figure 10:
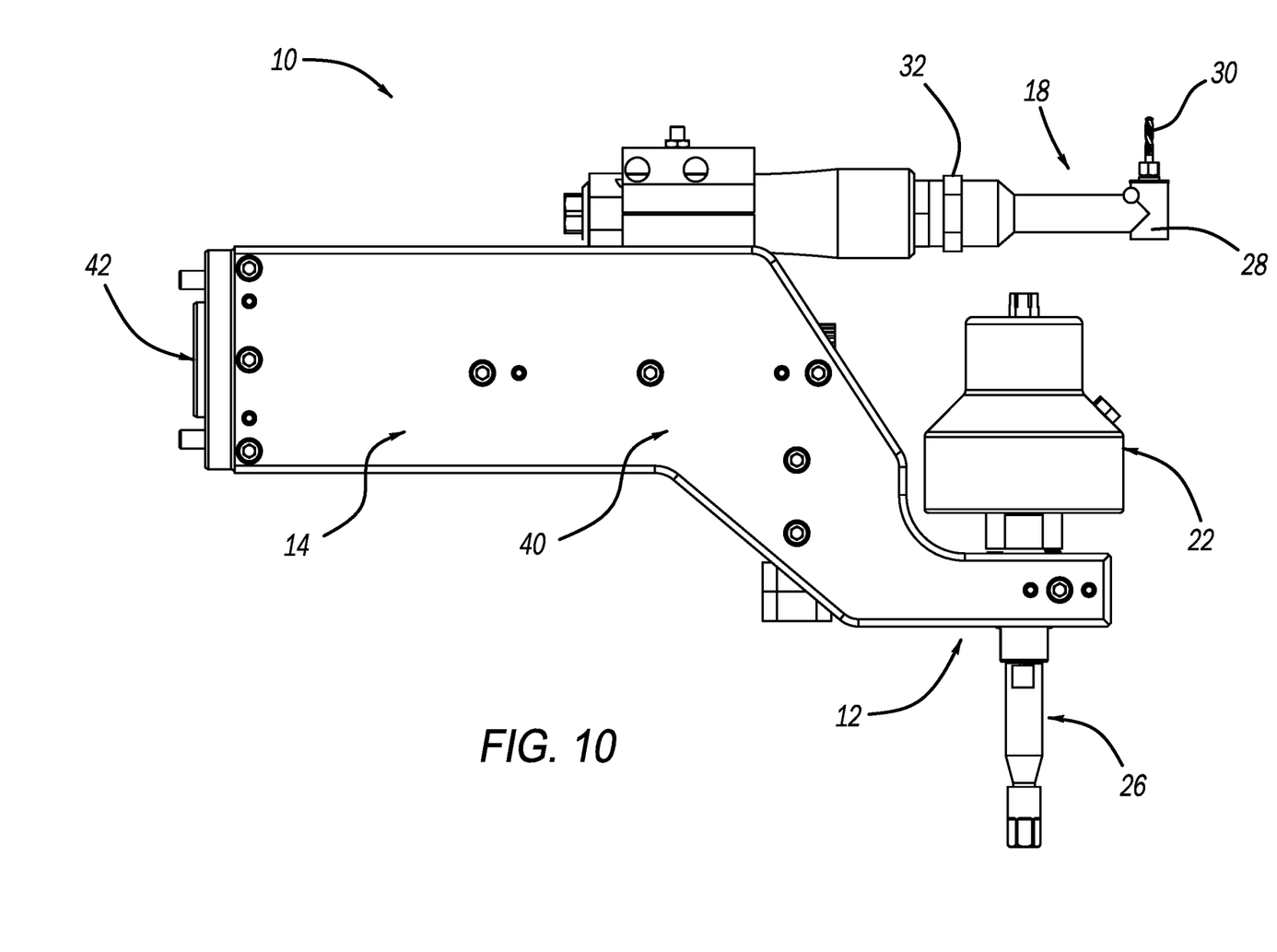
FIG. 10 schematically illustrates an advanced position of the router or drilling system, in accordance with the present invention.

Both of the first and second air supply valves 120 and 130 may be controlled by 24 VDC, for example, to selectively actuate the pneumatic linear motion slide 34 and/or the router/drill 18, respectively. The pneumatic slide 34 is normally biased close, by a spring-actuated solenoid for example, to remain in a closed position within the housing 40 during periods of non-use of the router/drill 18, as shown in FIG. 9. Once the first air valve 120 providing air to the first air line or hose 114 or hose 115 is opened, as directed by the controller 122, the pneumatic slide 34 is biased to the extended or retracted position, respectively. See FIGS. 9 and 10. Accordingly, the air supply 112 fluidly communicates with the piston 117 within the cylinder 60, for extension and retraction of the piston 117, and for extension and retraction of the router/drill system 18.

As shown in FIG. 8 third valve 150, also actuated by a signal from the controller 122, selectively regulates the air supply 112 provided through a fourth air line 152, to the water jet assembly 16. The high-pressure water supply valve 22, normally closed, is actuated by air pressure provided through the fourth air line 152. Once the air pressure is terminated from the third valve 150, the water pressure valve 22 returns to its normally closed position. The third air supply valve may also be controlled by 24 VDC, for example, to selectively actuate the water jet assembly system 16. As with the first valve 120 and the second valve 130, and as shown in FIG. 12A, the third valve 150 contains a water jet exhaust 210 for venting residual air from the water jet assembly 16 upon termination of the operation of the water jet assembly 16.

In operation, the router or drill system 18 is used for forming small holes and piercing the product material. The waterjet system 16, on the other hand, is substantially used for making perimeter cuts to the product material. Sometimes, the hole produced by the router or drill system 18 is sufficient, while in other applications, larger cuts are needed and facilitated by the water jet assembly system 16. It will be appreciated that unlike any other end-of-arm tool currently available, the present end-of-arm tool 10, or system 100, provides two functions of initiating the cut or drilling smaller holes, and if necessary, also completing the peripheral cuts. This results in a substantial reduction in waste material. Additionally, the current process provides two functions with one tool thereby saving time, and mitigating the need to spend capital on additional robots and/or tools. In yet another advantage, the packaging space of the combined router or drill assembly 18 and the water jet system 16 is substantially reduced, thereby providing a packaging advantage in the tool itself, and also a reduction in the amount of plant floor space typically required for both the drilling/routing and water jet functions.

Multi-axis robots that are used in conjunction with the present combination end-of-arm tool 10 includes 6-axis robotic cutting systems provided by companies such as Fanuc, Yaskawa, Motoman, ABB, Kuka, and others. The present systems are useful for molded or other parts made from composites such as sheet molding compounds (SMC), carbon fiber reinforced plastic (CFRP), fiberglass reinforced plastics (FRP), resin transfer molding (RTM) materials, dicyclopentadiene (DCPD), fiberglass, composite parts, and other materials. Damage to these materials may increase the production costs and also increase the scrap and manufacturing time, for example. Examples of molded composite parts include heavy truck panels, marine decks and hulls, consoles, truck caps, and more.

Exemplary manufacturers or suppliers that supply various constituents of the present systems and combination end-of-arm tool 10, 100 include: waterjet pumps and valves by Hypertherm; robots by Fanuc and Yaskawa; rails and carriage by McMaster-Carr or Parker Hannifin; drill systems and right-angle drill systems by Michigan Pneumatic Tool; and Alliance Automation LLC for all other parts.

In another aspect of the invention, a method of manufacturing a material using a robotic end-of-arm tool in accordance with the present invention is as follows:

1. Provide a robot containing an end-of-arm tool that has a router or drilling system 18 and a waterjet system 16 integrated therein;
2. Provide a product material for processing by the robot;
3. Actuate a router or drilling system and initiate at least one small cutting point, and if desired, at least one more hole in the product material; and if necessary
4. Actuate an optional waterjet system and cut at least one cut about the periphery of the small cutting point.

By boring a small cutting point in the product material before cutting about the periphery of the product, cracks or de-laminations emanating from the small cutting point are thereby substantially or completely prevented.

As schematically illustrated in FIG. 8, another embodiment contains a robotic system 100 that contains an end-of-arm multitool 110. A compressed air supply 112 fluidly and operably communicates with the air cylinder 60, which as described above, actuates the pneumatic slide 34. The first air line 114 contains a first end 116 and a second end 118, whereby the first end 116 is connected to the air supply 112, and the second end 118 is connected to the air cylinder 60. The first air valve 120 selectively regulates air flow to the air cylinder 60, upon receiving a signal from the robotic control module or controller 122. As known in the art, the robotic control module or controller 122 can electrically actuate a number of functions carried out by the robot, and accordingly, the first air valve 120 may be selectively opened to provide compressed air flow to the air cylinder 60.

Similarly, the third air line 124 contains a third end 126 and a fourth end 128, whereby the third end 126 is connected to the air supply 112 and the fourth end 128 is connected to the router or drill system 18. Accordingly, in this way the air supply 112 fluidly and operably communicates with the router or drill system 18. Yet further, the second air valve 130 also selectively regulates air flow to the router or drill system 18, upon receipt of a signal from the robotic control module 122. Accordingly, the second air valve 130 may be selectively opened to provide compressed air flow to the router or drill system 18.

Again, in a similar way, the waterjet system 16 may also be selectively regulated by the robotic control module 122. A water line 132 contains a fifth end 134 and a sixth end 136, to thereby connect the high-pressure water supply 138 to the waterjet system 16. Accordingly, the fifth end 134 is connected to the water supply 138 and the sixth end 136 is connected to the water jet on/off valve 22 at the high-pressure water inlet 24, to thereby provide fluid communication between the water supply 134 and the waterjet system 16.

With reference to FIGS. 12A and 12B, a schematic flow chart illustrates the fluid communication between the air supply 112 and various subassemblies within the overall combination end-of-arm tool 10. As shown, the router or drill motor 144 of the router/drill assembly 18 fluidly communicates with the air supply 112 as air is introduced through the second air valve 130. As further shown, the dual-acting actuator/cylinder 60 for advancing or extension, and then retraction of the router/drill system 18 fluidly communicates with the air supply 112 as air is introduced through the first air valve 120. As further shown, the water jet on/off valve 22 for actuation of the water jet assembly system 16 fluidly communicates with the air supply 112 as air is introduced through the third air valve 150.

Figure 13A:
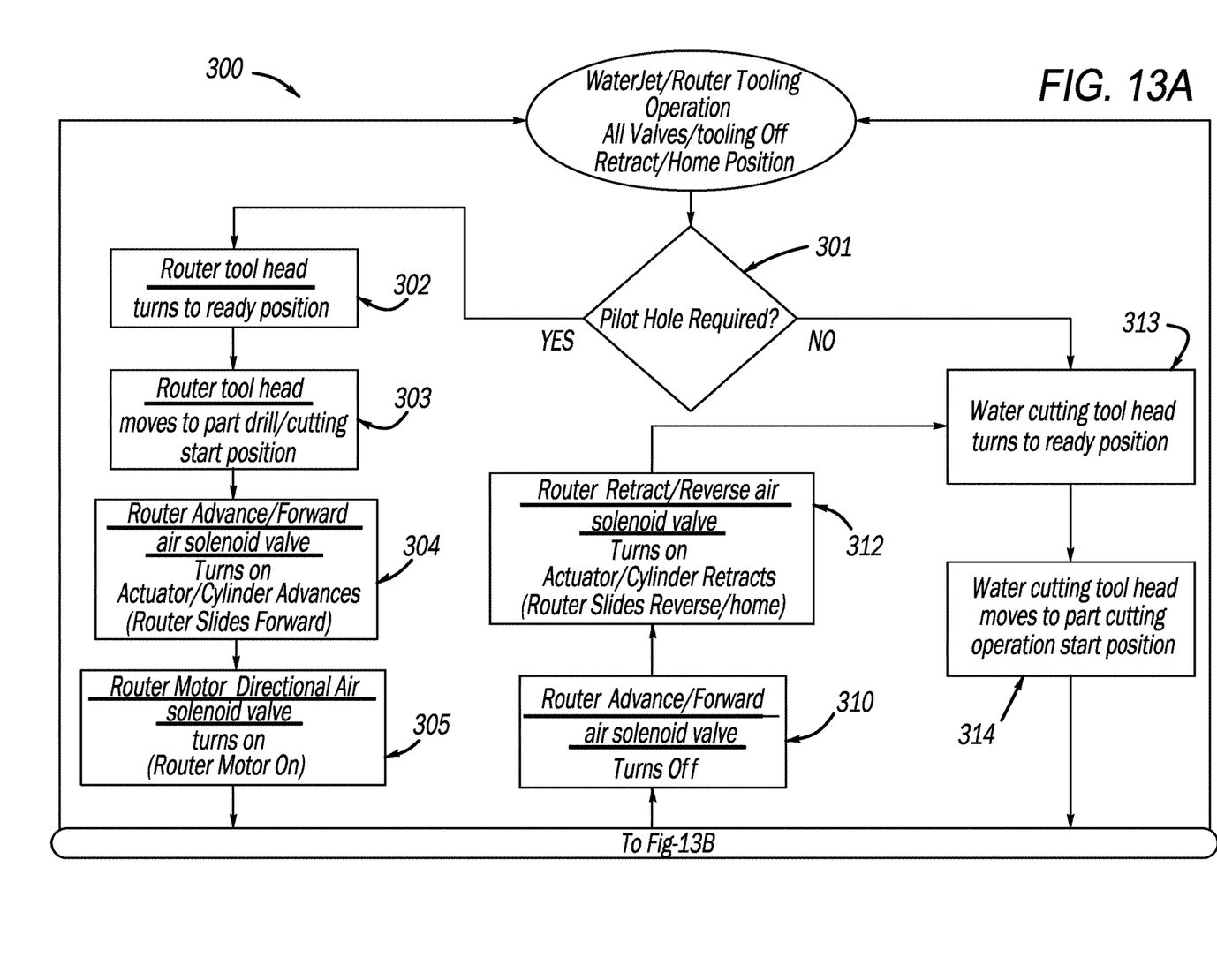
FIG. 13A is a first portion of a Boolean flow chart of the operation of the combination tool, in accordance with the present invention.
Figure 13B:
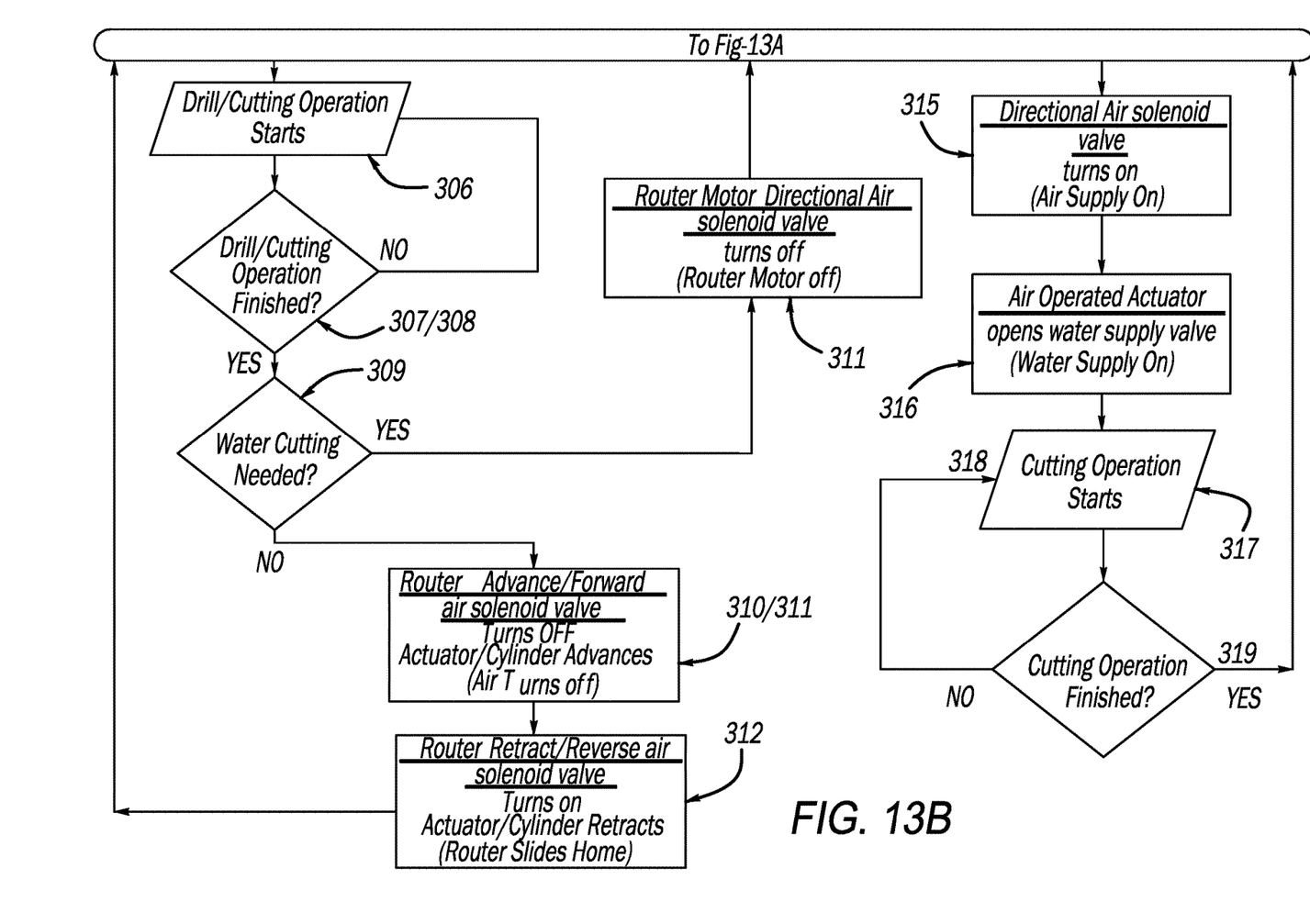
FIG. 13B is a second portion of a Boolean flow chart of the operation of the combination tool, in accordance with the present invention.

With reference to FIG. 13A and FIG. 13B, the operation of the combination end-of-arm tool 10, or the robotic water jet/router (or drill) tooling system 100, is illustrated. The starting condition of the tool 10 is exemplified and shown in FIG. 9, in which all of the valves and tooling are in the off or retracted positions. A pilot hole decision 301 is made as to whether a pilot hole, or piercing or cutting hole, is required to initiate a larger cut and avoid cracks. If yes, then as shown in FIG. 13A and FIG. 13B, a first set of steps for the drilling or routing process 300, by and through the controller 122, are undertaken in the following order:

301. Decide whether a piercing or cutting hole is needed.
302. Turn router or drill head to ready position.
303. Move router or drill to part drill/cutting start position.
304. Turn on the router/drill advance/forward air solenoid valve 146, first air valve 120, to slide router or drill assembly 18 into an extended and operating position.
305. Turn on router motor directional air solenoid valve to turn the router motor 144 on.
306. Begin drill/cutting operation.
307. Determine if the drill/cutting operation is finished.
308. If no, continue with drill/cutting operation until finished.
309. Then determine if water jet cutting is needed.
310. Regardless of whether the water jet cutting is needed, turn the advance/forward air solenoid valve of the first valve 120, off.
311. Turn off the router/drill 18 when cutting is complete.
312. Then, turn on the retract/reverse air solenoid of the first valve 120, to retract the actuator/cylinder 60 and to slide the router home into the retracted position.

Again, with reference to FIGS. 13A and 13B, if and when the water jet cutting is required, the following second set of steps for the waterjet cutting process 300, by and through the controller 122, are undertaken in the following order:

313. Turn the water cutting tool head to the ready position.
314. Move water jet cutting tool head to the part cutting operation start position.
315. Turn on directional air solenoid valve, third air valve 150.
316. Turn on air-operated water supply valve 22 (water supply 138 on).
317. Start the Cutting Operation.
318. Continue until finished.
319. Turn off the water valve 22 and the third air supply valve 150 to turn off the water jet assembly system 16.

While one or more preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. An end-of-arm tool for a robot comprising:
   a housing having a first end and a second end;
   an extendable and retractable router or drilling system contained within said housing; and
   a waterjet system contained within said housing and fixed adjacent to said router or drilling system, said waterjet system plumbed to a high-pressure water source.

2. The tool of claim 1 further comprising:
   a pneumatically actuated linear motion slide longitudinally fixed and oriented within said housing, wherein said router or drilling system is slidably engaged with said linear motion slide, for extension and retraction of said router or drilling system.

3. The tool of claim 2 wherein said linear motion slide further comprises:
   a set of rails fixed within said housing; and a carriage seated on said set of rails for slidable engagement thereon, wherein said router or drilling system is fixed to said carriage and slidably engaged with said rails.

4. The tool of claim 1 wherein said waterjet system is pneumatically actuated.

5. The tool of claim 1 wherein said router or drilling system is a right-angle router or drilling system.

6. A robotic manufacturing system comprising:
a robot containing an arm having an end;
a combination end-of-arm tool fixed to the end of the arm, said tool containing a housing having a first end and a second end;
an extendable and retractable router or drilling system contained within said housing; and
a waterjet system contained within said housing and fixed adjacent to said drilling system, said waterjet system plumbed to a high-pressure water source.

7. The robotic manufacturing system of claim 6 further comprising:
a linear motion slide longitudinally fixed and oriented within said housing, wherein said router or drilling system is fixed to said linear motion slide for retraction and extension thereof.

8. The robotic manufacturing system of claim 7 wherein said linear motion slide is pneumatically actuated and said router or drilling system is orthogonally oriented to said linear motion slide.

9. The robotic manufacturing system of claim 7 wherein said linear motion slide further comprises:
a set of rails fixed within said housing; and
a carriage seated on said set of rails for slidable engagement with said set of rails,
wherein said router or drilling system is fixed to said carriage and slidably engaged with said rails.

10. The robotic manufacturing system of claim 6 wherein said extendable and retractable router or drilling system adjacent to said waterjet system, and, said router or drilling system extends to operably clear said waterjet system.

11. The robotic manufacturing system of claim 10 wherein said extendable and retractable router or drilling system is inversely oriented to said waterjet system.

12. The robotic manufacturing system of claim 6 wherein said router or drilling system is pneumatically actuated.

13. A robotic manufacturing system comprising:
a robot containing an arm having an end;
a combination end-of-arm tool fixed to the end of the arm, said tool containing a housing having a first end and a second end;
a router or drilling system contained within said housing;
a linear motion slide longitudinally fixed and oriented within said housing, wherein said router or drilling system is fixed to said linear motion slide for retraction and extension thereof; and
a waterjet system contained within said housing and fixed adjacent to said router or drilling system, said waterjet system plumbed to a high-pressure water source.

14. The robotic manufacturing system of claim 13 wherein said linear motion slide is pneumatically actuated.

15. The robotic manufacturing system of claim 13 wherein said router or drilling system is a right-angle router or drilling system in inverse relation to said waterjet system.

16. The robotic manufacturing system of claim 13 wherein said linear motion slide is electronically actuated.

* * * * *